US008807020B2

(12) United States Patent
Tahincioglu (10) Patent No.: US 8,807,020 B2
(45) Date of Patent: Aug. 19, 2014

(54) TOASTING APPARATUS WITH A HANDLE HAVING PREDETERMINED LOCKING POSITIONS (75) Inventor: Besim Tahincioglu, Gebze (TR)

(73) Assignee: Eksen Makine Sanayi ve Ticaret, Gebze, Kocaeli (TR)

( * ) Notice: Subject to any disclaimer, the term of this patent is extended or adjusted under 35 U.S.C. 154(b) by 288 days.

(21) Appl. No.: 13/319,150

(22) PCT Filed: May 6, 2010

(86) PCT No.: PCT/EP2010/056218
§ 371 (c)(1),
(2), (4) Date: Dec. 7, 2011

(87) PCT Pub. No.: WO2010/128123
PCT Pub. Date: Nov. 11, 2010

(65) Prior Publication Data
US 2012/0137897 A1   Jun. 7, 2012

(30) Foreign Application Priority Data
May 7, 2009   (EP) .................................... 09159686

(51) Int. Cl.
A47J 37/08   (2006.01)
(52) U.S. Cl.
USPC .................. 99/379; 99/372; 99/377; 16/332; 16/325; 16/342

(58) Field of Classification Search
USPC ........... 99/379, 377, 376, 375, 374, 372, 380; 16/332, 342, 325, 321, 319
See application file for complete search history.

(56) References Cited

U.S. PATENT DOCUMENTS

| 6,363,835 B1* | 4/2002 | Wu ................................. 99/331 |
| 6,439,108 B1* | 8/2002 | Wu ................................. 99/349 |
| 6,609,273 B1* | 8/2003 | Yamada et al. ................. 16/332 |
| 7,600,469 B2* | 10/2009 | Lin ................................. 99/349 |
| 8,365,655 B2* | 2/2013 | Chen .............................. 99/372 |
| 2007/0039132 A1* | 2/2007 | Jung et al. ...................... 16/325 |
| 2009/0000491 A1* | 1/2009 | Chen .............................. 99/379 |
| 2010/0132566 A1* | 6/2010 | Serra et al. ..................... 99/331 |

* cited by examiner

Primary Examiner — Reginald L Alexander
(74) Attorney, Agent, or Firm — Robert L. Epstein; Epstein Drangel LLP (57) ABSTRACT The present invention proposes a toaster appliance in which an upper grilling plate is typically hinged to the lower grilling plate in a manner to be rotatable relative to said lower plate. The position of said upper plate relative to said lower plate is conventionally adjusted by means of a handle having predetermined locking positions according to the present invention. Said handle is provided with a connection device having a predetermined locking position, which is set to a perpendicular position of said upper plate relative to said lower plate. Said locking position is determined by a plurality of slots into which a set of spring loaded balls engages within said connection device.

7 Claims, 8 Drawing Sheets

TOASTING APPARATUS WITH A HANDLE HAVING PREDETERMINED LOCKING POSITIONS

TECHNICAL FIELD OF THE INVENTION

The present invention relates to a handle arrangement for use in an electrical household appliance, namely in a grilling apparatus.

BACKGROUND OF THE INVENTION

Toasters are widely used all over the world. A toaster of the present type generally has a pair of hinged grilling plates receiving food article between them. The upper grilling plate being rotatable with respect to the lower grilling plate, when closed, defines a heating chamber for grilling a food article, for instance slices of bread.

Toasters are generally provided with suitable handling means allowing users to elevate the upper grilling plate. This handling means is mechanically connected to the upper grill such that displacement of the handling means itself provides opening of the upper grill.

The present invention provides an upper grill handling means for a toaster appliance having a connection device providing predetermined locking positions to allow safe and stationary positioning of the upper grill when elevated.

OBJECTS OF THE INVENTION

One of the objects of the present invention is to provide a toasting appliance having a handle attached to the upper grill of the appliance such that said upper grill is releasably locked in predetermined positions.

SUMMARY OF THE INVENTION

The present invention proposes a toaster appliance in which an upper grilling plate is typically hinged to the lower grilling plate in a manner to be rotatable relative to said lower plate. The position of said upper plate relative to said lower plate is conventionally adjusted by means of a handle having predetermined locking positions according to the present invention. Said handle is provided with a connection device having a predetermined locking position, which is set to a perpendicular position of said upper plate relative to said lower plate. Said locking position is determined by a plurality of slots into which a set of spring loaded balls engages within said connection device.

BRIEF DESCRIPTION OF THE FIGURES

Accompanying drawings are given solely for the purpose of exemplifying a toasting apparatus with a predetermined position handling means, which will be explained in detail hereinafter.

While FIGS. 8a and b demonstrate locked and release positions of the upper plate, FIGS. 8c to 8e demonstrate different positions of the upper plate.

DETAILED DESCRIPTION OF THE INVENTION

Referring now to the figures outlined above, the present invention proposes an electrical household appliance and namely a toasting apparatus with an improved handle assembly. The apparatus typically features a lower plate stationary on a base part, the latter housing control electronics and driving mechanisms as will be explained hereinafter. A control panel typically provides users with different grilling options for instance to allow a longer grilling period. A user therefore setting a timer to a specified duration of grilling time of preference will energize heat sources being electric resistances of conventional tubular type. Those are provided within the upper and lower plate housings.

The upper grilling plate according to the present invention is typically hinged to the lower grilling plate in a manner to be rotatable relative to said lower plate. The upper grilling plate is therefore adapted to be closed upon sad lower grilling plate in a closed grilling position so as to provide a grilling chamber in which a food article being in contact with said plates from above and below. The position of said upper plate relative to said lower plate is conventionally adjusted by means of a handle having predetermined locking positions according to the present invention.

The handle is provided with a connection device (12) according to the present invention. A predetermined locking position, which is set to a perpendicular position of said upper plate relative to said lower plate, is determined by a plurality of slots into which a set of spring loaded rollers engages within said connection device (12).

The connection device (12) according to the present invention features two rollers (13) associated with respective roller bearings (14), each set of roller (13) and roller bearing (14) being divided by a helical spring (15).

Figure 1:
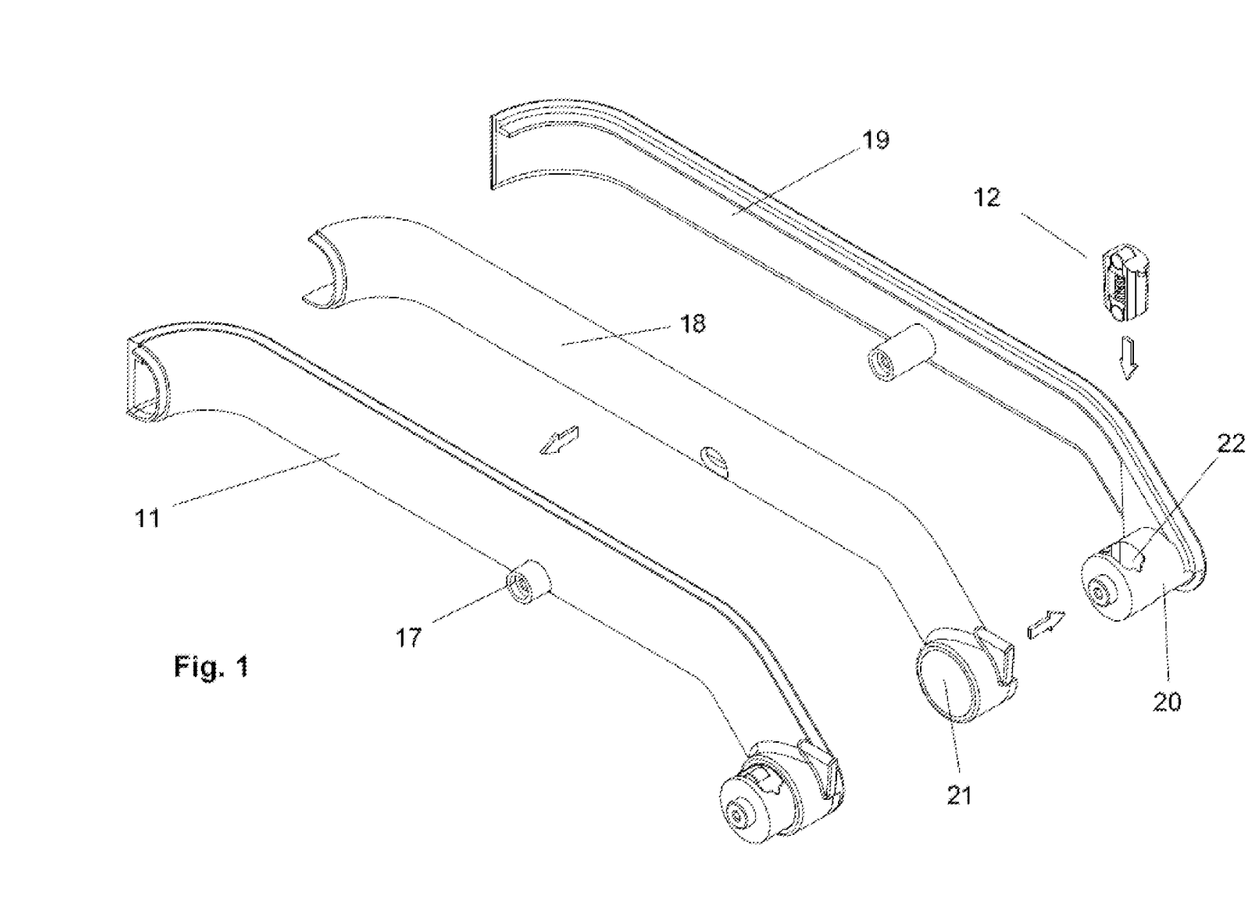
FIG. 1 demonstrates a perspective view of the handle according to the present invention.

The handle assembly according to the present invention is comprised of two handle units (11). Each handle unit (11) at both sides of the upper grilling plate is laterally mounted to said upper plate by means of a connection tip (17). Obviously, only one connection tip (17) is shown in FIG. 1 where it connects the upper plate to the right hand side handle unit (11).

Figure 2:
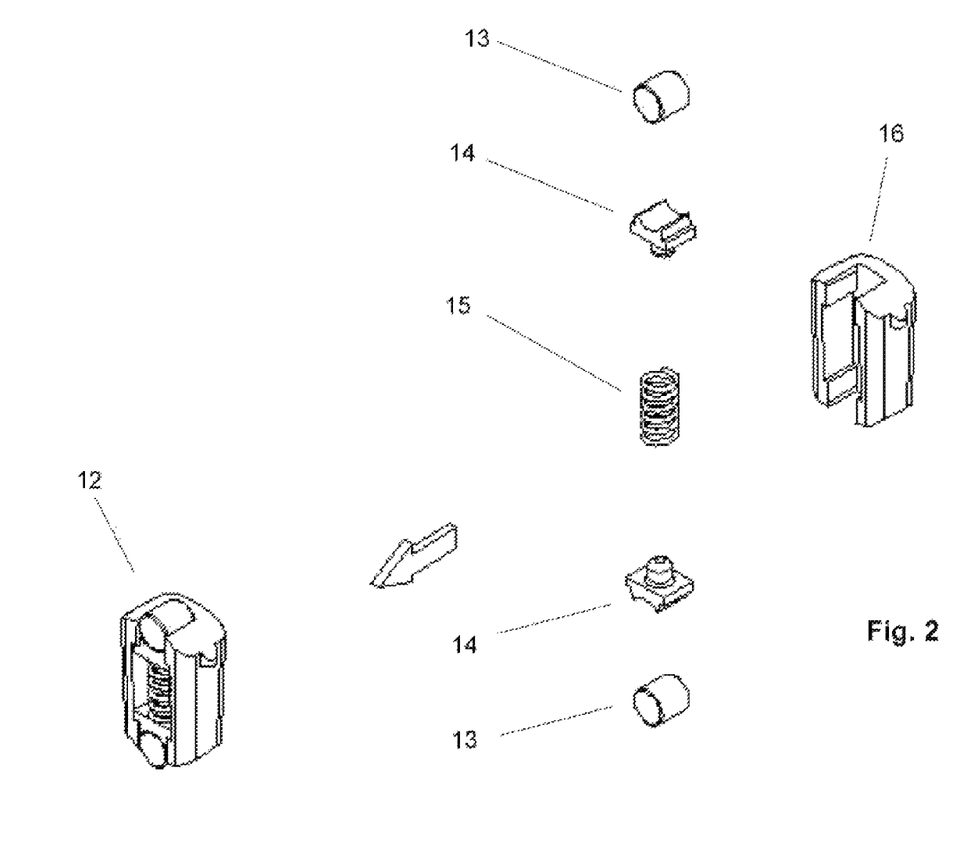
FIG. 2 demonstrates the connection device of the handle according to the present invention.
Figures 3A, 3B:
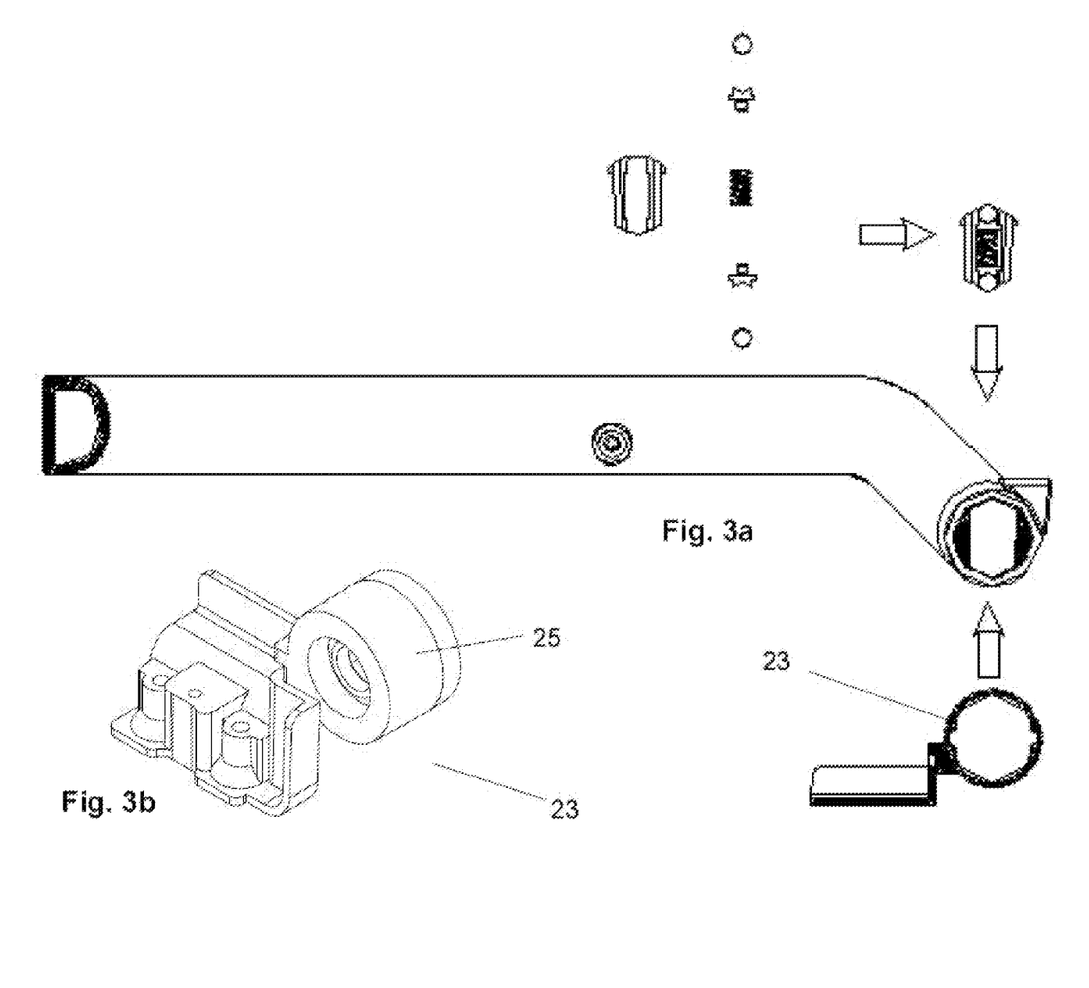
FIG. 3a demonstrates side view of the handle together with an exploded view of the connection device according to the present invention.
FIG. 3b demonstrates stationary part of the lower grilling plate according to the present invention.
Figure 4:
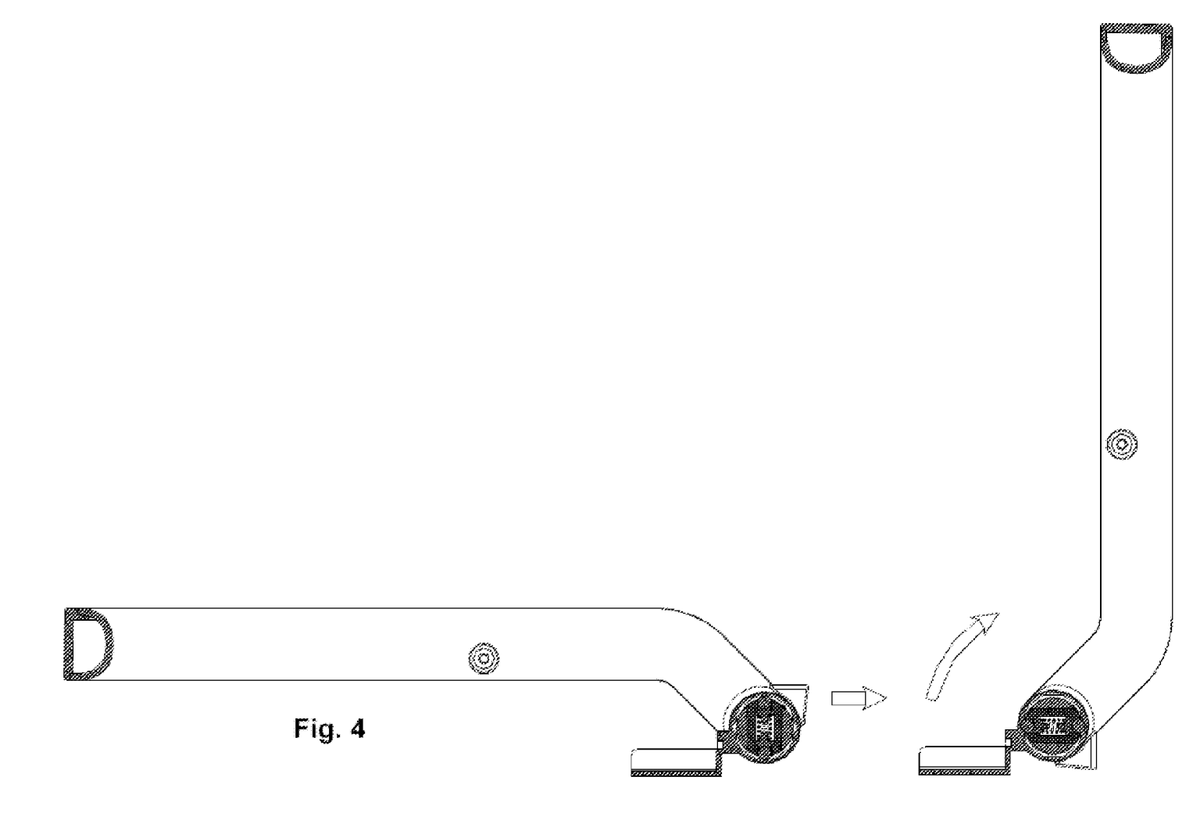
FIG. 4 demonstrates side views of the handle in closed and opened positions according to the present invention.

Each handle unit (11) according to the present invention is comprised of a handle body (18) and a cover (19). Said cover (19) is mounted to said handle body (18) the protruding root portion (20) of said cover (19) fits into a slot (21) on said body (18) as demonstrated in FIG. 1. Before mounting said cover (19), said connection device (12) is assembled as in FIG. 2 and is engaged in a suitable slot (22) on said protruding root portion (20) of the cover (19). When the body (16) of the connection device (12) is inserted in said slot (22), said cover can be installed to build up said handle unit (11).

Figure 5A:
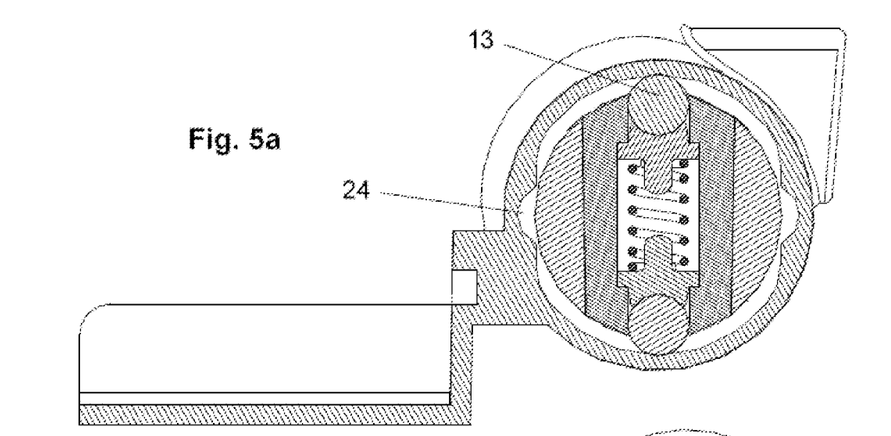
FIGS. 5a and 5b demonstrate cross-sections of the connection device in closed and opened position of the upper grilling plate according to the present invention.
Figure 5B:
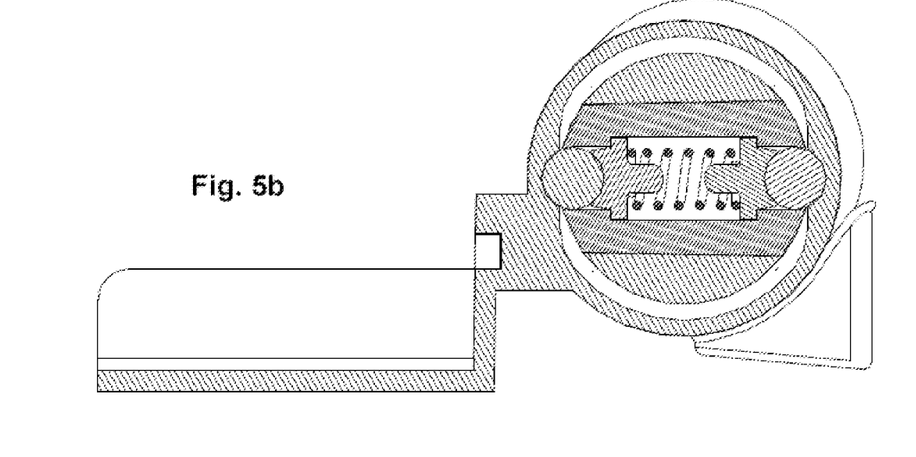
Figure 6:
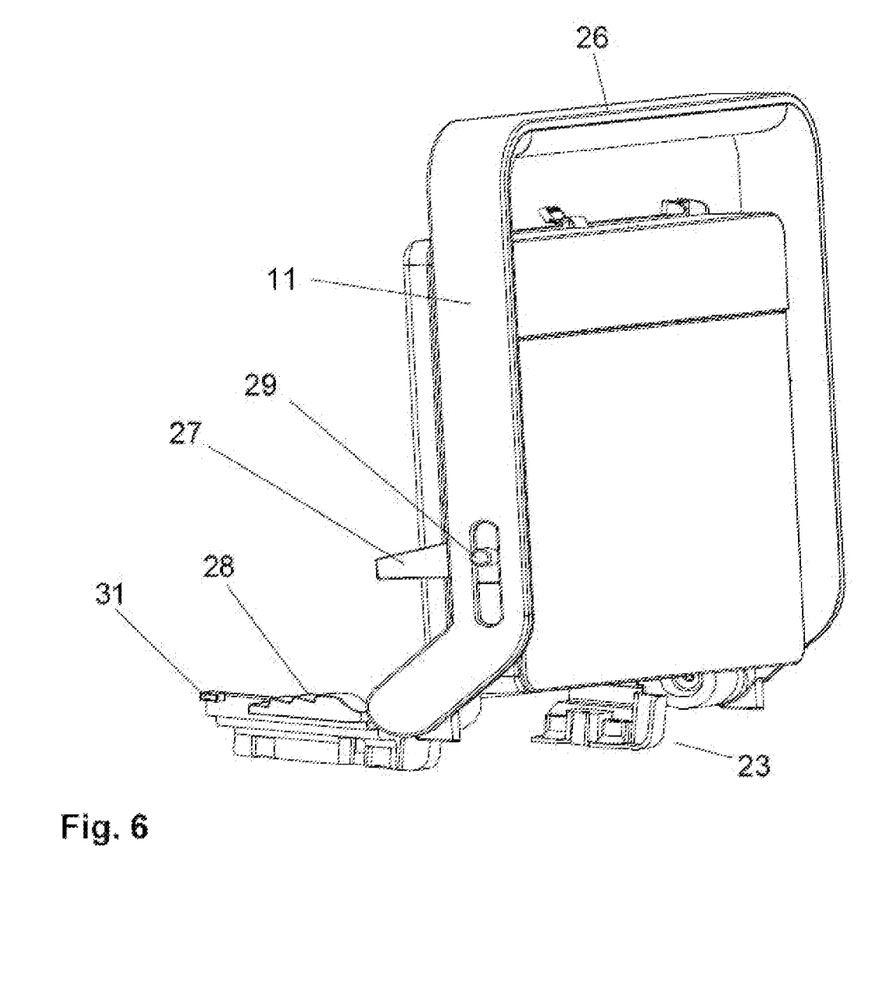
FIG. 6 demonstrates a perspective view of the handle connected to the upper plate according to the present invention.

While FIG. 5a demonstrates the cross-sectional view of the connection device (12) in the closed position of the upper plate, FIG. 5b demonstrates the open position of the same. When assembled, said handle unit (11) is then mounted to the lower grilling plate. A hinge part (23) of the lower grilling plate receives said protruding root portion (20) of said cover (19) previously mounted to said handle unit (18).

Said hinge part (23) being stationary relative to said rotatable handle unit (11), comprises a cylindrical portion (25) with a cylindrical cavity for receiving said protruding root portion (20). Said cylindrical portion (25) of said hinge part (23) comprises longitudinal grooves (24) on the inner surface of said cylindrical portion (25) for receiving part of said rollers (13). Simultaneous rotation of the two handle units (11) attached to each other by a front member (26) effects rotation of the connection device (12) in said cylindrical cavity of said cylindrical portion (25), thereby displacing the 180-degrees phased rollers (13) to be locked in said longitudinal grooves (24).

In summary, the present invention presents a toasting apparatus with a connection device (12) being rotatable by the handle in a cylindrical portion (25) of the upper grilling plate of the apparatus. Said connection device (12) comprises at least one locking means (13) engageable in a slot (24) in said cylindrical portion (25). Said connection device (12) further comprises a carrier body (16) having at least one opening within which said at least one locking means (13) is partly projectable through said at least one opening outwardly from said carrier body (16) by means of a spring means (15). Said connection device (12) comprises two rollers (13) projectable from said carrier body (16), said rollers (13) being associated with roller bearings (14), each pair of roller (13) and roller bearing (14) being divided by a helical spring (15).

The present invention further provides an upper plate which can be gradually positioned above the lower plate. This later function is fulfilled by a separate leveling means (27) which can selectively be fixed on a position adjustment support (28). The upper plate can therefore be set apart from the food item being grilled to a desired extent.

Said leveling means (27) has a lower end (28) and a selection pin (29). Said pin (29) is movable in a cavity (30) of the handle unit (11) according to the positioning of the upper plate as represented in FIGS. 8c to 8d. Further, it is possible to lock said upper plate in the closed position thereof by advancing said pin (29) such that said lower end (28) of said leveling means (27) fits into a groove (31) associated with the lower plate as represented in FIGS. 8a and 8b.

Figure 7:
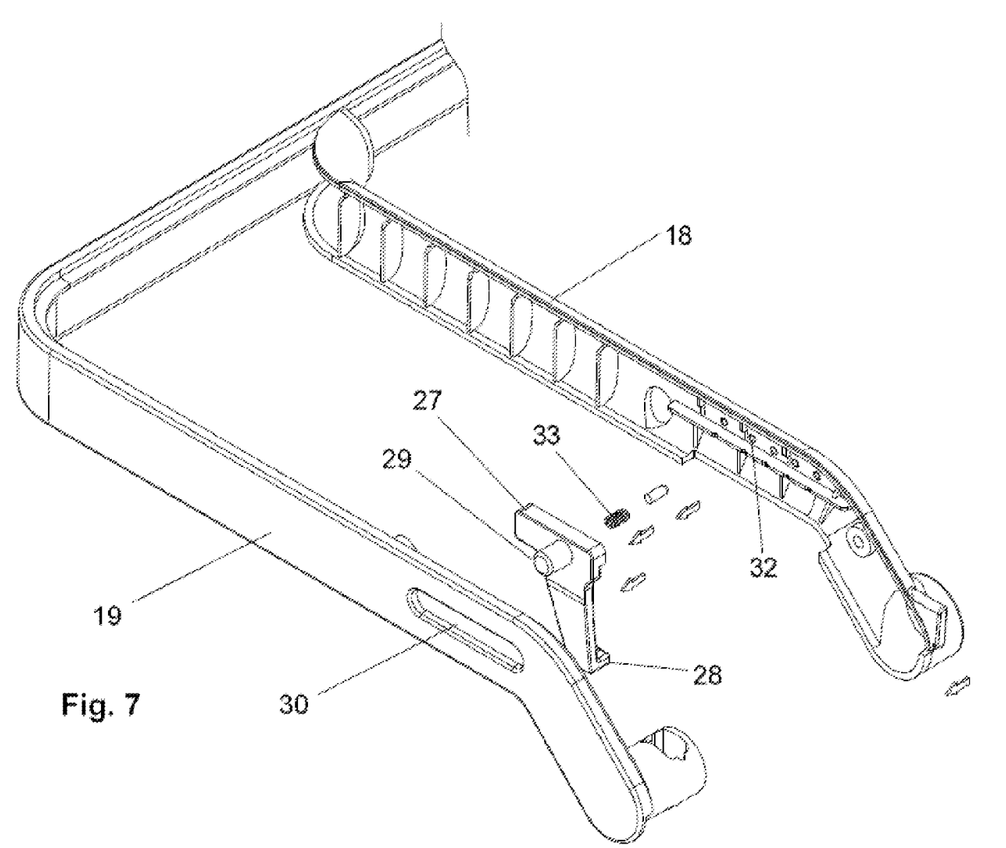
FIG. 7 represents a perspective view of the leveling mechanism according to the present invention.
Figure 8:
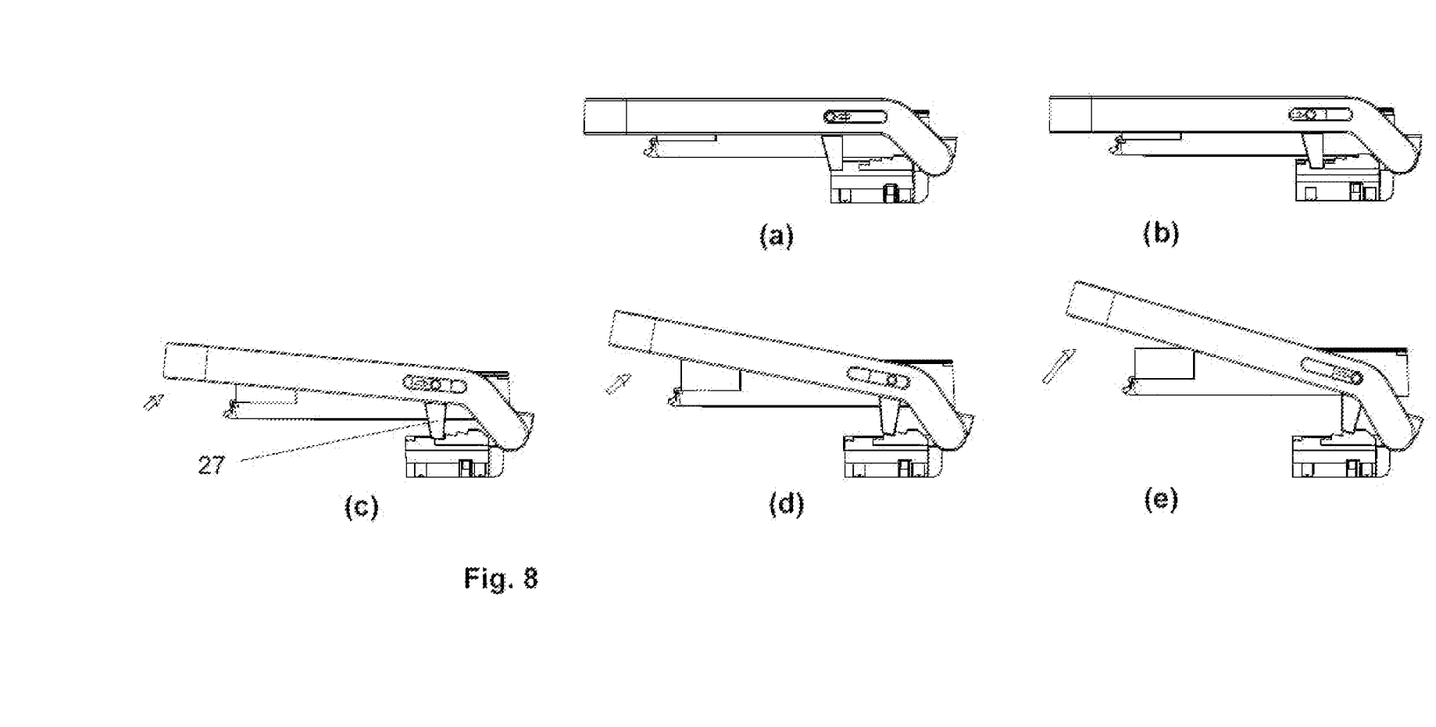

Said handle body (18) and said cover (19) are shown in FIG. 7. In contrast to FIG. 1 where right hand set of handle body (18) and cover (19) is demonstrated, FIG. 8 shows the left hand handle body (18) and cover (19) of the handle unit (11). Both handle units are actually identical apart from the fact that they are demonstrated from different angles in FIGS. 1 and 7. Said selection pin (29) is positioned on the internal surface of said handle body (18) to be trapped in a respective slot (32) by means of a spring (33).

The invention claimed is:

1. An electrical household appliance and particularly a toasting apparatus having a first grilling plate rotatably hinged to a stationary second grilling plate, said first grilling plate comprising a handle for effecting rotation of said first plate relative to said second plate, said handle comprising two handle units (11) at both sides of said first grilling plate, each unit (11) being mounted to said second grilling plate by means of a connection device (12) characterized in that said connection device (12) is rotatable by said handle in a cylindrical portion (25) of said second grilling plate and said connection device (12) comprises at least one locking means (13) engageable in a slot (24) in said cylindrical portion (25) whereby engaging of said at least one locking means (13) in said slot (24) provides that position of said first grilling plate relative to said second grilling plate is maintained, wherein said connection device (12) comprises a carrier body (16) having at least one opening within which said at least one locking means (13) is partly projectable through said at least one opening outwardly from said carrier body (16) by means of a spring means (15), and wherein said connection device (12) comprises two rollers (13) projectable from said carrier body (16), said rollers (13) being associated with roller bearings (14), each pair of roller (13) and roller bearing (14) being divided by a helical spring (15).

2. An electrical household appliance as in claim 1 wherein said cylindrical portion (25) comprises longitudinal grooves (24) on the inner surface of said cylindrical portion (25) for receiving part of said rollers (13).

3. An electrical household appliance as in claim 2 wherein said rollers (13) are 180-degrees phased.

4. An electrical household appliance as in claim 1 wherein said handle units (11) comprise leveling means (27) which can selectively be fixed on a position adjustment support (28) associated with said second plate.

5. An electrical household appliance as in claim 4 wherein said leveling means (27) has a lower end (28) engageable with a groove (31) associated with the lower plate.

6. An electrical household appliance as in claim 4 wherein said leveling means (27) has a selection pin (29) movable in a cavity (30) of the handle unit (11).

7. An electrical household appliance as in claim 6 wherein said selection pin (29) is positioned on the internal surface of said handle body (18) to be trapped in a respective slot (32) by means of a spring (33).

\* \* \* \* \*